United States Patent [19]
Chacon et al.

[11] Patent Number: 5,831,819
[45] Date of Patent: Nov. 3, 1998

[54] HAND-HELD DATA COLLECTION TERMINAL WITH A CONTOURED PROTRUSION

[75] Inventors: Debbie A. Chacon, Seattle; Daniel J. Blase, Everett; James R. Stewart, Woodinville, all of Wash.

[73] Assignee: Intermec Corporation, Everett, Wash.

[21] Appl. No.: 855,056

[22] Filed: May 13, 1997

[51] Int. Cl.⁶ .................................. G06F 1/16; H05K 5/02
[52] U.S. Cl. ............................................................ 361/683
[58] Field of Search .......................... 364/708.1; 361/683; 235/462, 472

[56] References Cited

U.S. PATENT DOCUMENTS

| | | | |
|---|---|---|---|
| D. 302,265 | 7/1989 | Siegner et al. | D14/100 |
| D. 312,622 | 12/1990 | Alden et al. | D14/100 |
| D. 332,604 | 1/1993 | Miyake et al. | D14/100 |
| D. 338,658 | 8/1993 | Suzuki | D14/100 |
| D. 357,917 | 5/1995 | Ito et al. | D14/218 |
| 5,123,064 | 6/1992 | Hacker et al. | 382/313 |
| 5,237,162 | 8/1993 | Harden et al. | 235/472 |
| 5,616,906 | 4/1997 | Kumar | 235/472 X |

OTHER PUBLICATIONS

9445 Bar Code Trakker Scanner, Product Brochure, Intermec Corporation, Sep., 1993.
Janus 2010 Hand–Held Data Collection Computer, Product Brochure, Intermec Corporation, Jun., 1993.
9430 Bar Code Portable Transaction Manager, Product Brochure, Intermec Corporation, Feb., 1992.
9189 Radio Frequency Gateway, Product Brochure, Intermec Corporation, Jan., 1992.
9560 Bar Code Transaction Manager, Product Brochure, Intermec Corporation, Oct., 1991.
9465 Radio Frequency Transaction Manager, Product Brochure, Intermec Corporation, Jul., 1991.
9191 1700 Satellite Wand Station & Keyboard, Product Brochure, Intermec Corporation, May, 1991.
9460 9462 Environmentally Sealed/Intrinsically Safe Trakkers, Product Brochure, Intermec Corporation, Apr., 1991.
1461 Charge–Coupled Device Scanner, Product Brochure, Intermec Corporation, Apr., 1991.
9550 Bar Code Transaction Manager, Product Brochure, Intermec Corporation, Mar., 1991.
9440 Bar Code Portable Transaction Manager, Product Brochure, Intermec Corporation, Jan., 1991.
9156 Bar Code Radio Frequency Gateway, Product Brochure, Intermec Corporation, Sep., 1990.

*Primary Examiner*—Michael W. Phillips
*Attorney, Agent, or Firm*—Seed and Berry LLP

[57] ABSTRACT

A hand-held computer having a contoured housing with a head, a body, and a neck portion therebetween, the housing having a contoured protrusion positioned on the body portion substantially adjacent the hand-held computer's center of gravity. The contoured protrusion is sized and ergonomically shaped to correspond to a support portion of the person's hand between approximately the metacarpal-phalangeal joint ridge and the proximal phalangeal joints when the hand-held computer is carried by the person. The hand-held computer has a longitudinal axis and a display screen that is oriented at a positive angle relative to the longitudinal axis for improved viewing by the user of the display screen. The hand-held computer includes a scanning unit that scans along a scanning axis that is angled downwardly at a negative angle relative to the longitudinal axis. A plurality of computer keys define a keypad plane such that the tilted display screen is at a selected angle relative to the keypad plane. The computer keys have different heights or shapes to easily distinguish the computer keys by feel without requiring the user to visually identify different keypads.

23 Claims, 3 Drawing Sheets

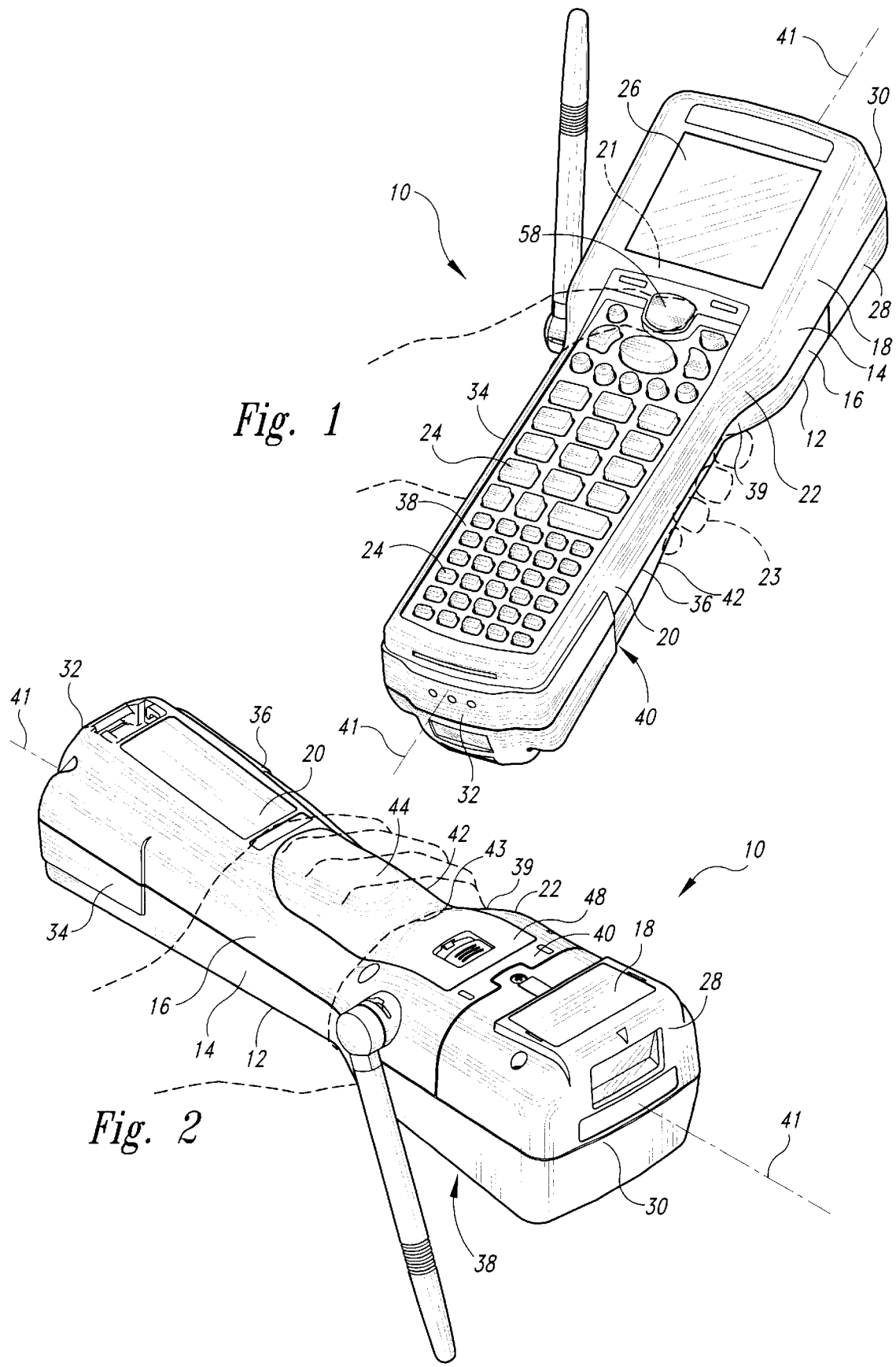

5,831,819

HAND-HELD DATA COLLECTION TERMINAL WITH A CONTOURED PROTRUSION

TECHNICAL FIELD

The present invention is directed toward electronic devices, and more particularly, toward hand-held electronic devices.

BACKGROUND OF THE INVENTION

Hand-held electronic devices such as computers, scanners, symbology readers, and the like are used extensively throughout various industries. For example, hand-held computers and scanners are used for managing inventory control, work-in-process tracking, asset tracking, etc., in a fast and efficient manner.

The conventional hand-held electronic device typically includes electrical components enclosed in a housing, and the device is shaped and sized to provide the smallest and lightest unit possible. Many hand-held electronic devices, however, are uncomfortable to hold and use over an extended period of time. A conventional hand-held device can also be difficult to comfortably hold during use because of the device's shape, weight, and balance. As a result, an operator can experience discomfort and fatigue, which often leads to an increase in operator errors.

Conventional hand-held electronic devices also have limited keypads that force the operator to learn difficult and cumbersome keystrokes to enter data. Other conventional hand-held electronic devices include a display screen that is parallel with the keypad, which often results in glare on the screen when the device is held in an operating position. Accordingly, the conventional hand-held electronic devices can be difficult to use in an efficient and comfortable manner.

SUMMARY OF THE INVENTION

The present invention provides a hand-held electronic device that overcomes problems experienced in the prior art and provides additional benefits. An exemplary embodiment of the present invention includes a hand-held computer having a contoured housing with a head that supports a display screen, a body that has a gripping portion to be gripped by a user, and a neck portion extending between the head and the gripping portion. The gripping portion is shaped and sized to be comfortably grasped by user's hand so the device's center of gravity is vertically aligned with the user's hand during operation of the device.

The gripping portion includes an ergonomically contoured protrusion that is substantially aligned with the device's center of gravity. The contoured protrusion is shaped and sized to correspond to part of the user's palm and fingers when the gripping portion is grasped by the user such that the hand held device is comfortable to hold.

The exemplary embodiment includes a plurality of computer keys connected to the housing's top side to define first and second keypads with keys having different shapes or heights relative to the housing's portion so the user can tactilely distinguish the keys from each other. The computer keys define a keypad plane, and in the exemplary embodiment, the display screen is tilted at a selected positive angle relative to the keypad plane to provide an improved viewing angle for the user.

The exemplary embodiment also includes a scanner unit attached to the housing's head and positioned to scan along a scanning plane that is oriented at a selected negative angle relative to the keypad plane. Accordingly, the display screen and the scanner units are angled in opposite directions relative to the keypad plane.

BRIEF DESCRIPTION OF THE DRAWINGS

FIG. 1 is a top rear end isometric view of a hand-held computer under an exemplary embodiment of the present invention with the user's left hand shown in phantom.

FIG. 2 is a bottom front end isometric view of the hand-held computer of FIG. 1 with the user's left hand shown in phantom.

DETAILED DESCRIPTION OF THE INVENTION

Figure 3:
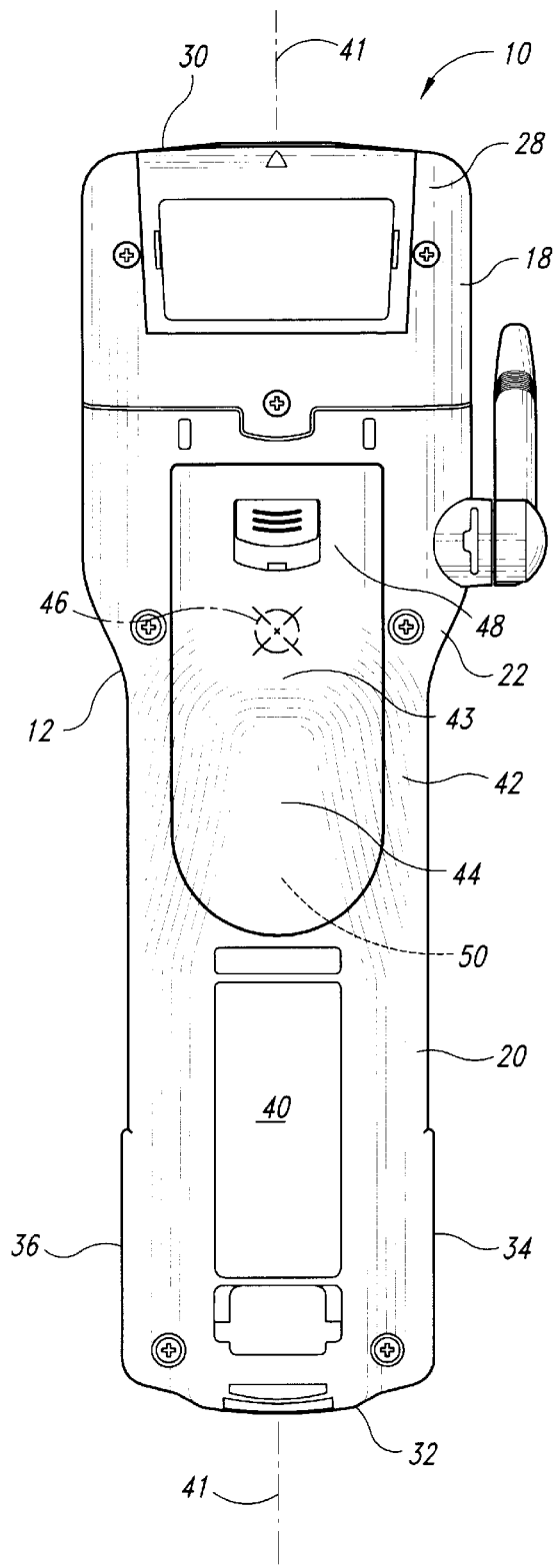
FIG. 3 is an enlarged bottom elevational view of the hand-held computer of FIG. 1.

An exemplary embodiment of a hand-held computer 10 in accordance with the present invention is described in detail herein and shown in the drawings for illustrative purposes. In the following description, numerous specific details are set forth, such as a specific hand-held electronic device, a contoured housing, keypads, a display screen, a scanner unit, a scanner plane, a longitudinal axis, etc., in order to provide a thorough understanding of the present invention. One skilled in the relevant art, however, will readily recognize that the present invention can be practiced without certain specific details or with other housings, display screens, keypads, scanning units, etc. In other instances, well-known structures are not shown in detail in order to avoid obscuring the present invention.

As best seen in FIG. 1, the hand-held computer 10 includes a housing 12 that is ergonomically shaped to allow a user to grasp and hold the computer in an easy and comfortable manner. The housing has a widened head 18, a narrowed body 20, and a neck portion 22 therebetween that tapers between the head and the body. In the exemplary embodiment, the housing 12 is formed by a molded rigid plastic material, such as a polycarbonate plastic. In alternate embodiments, other rigid housings made of plastic, metal, composites or the like, can be used, provided such material is suitable for use in conjunction with electronic components 21 contained within the hand-held computer 10.

For reference purposes, the hand-held computer 10 is described herein with the head 18 forward of the body 20, and with a top portion 14 of the housing 12 being interconnected to and above a bottom portion 16. Accordingly, the computer's housing 12 has a front end 30 formed by a part of the head 18, a back end 32 opposite the front end, and opposing left and right sides 34 and 36 extending between the front and back ends. The housing 12 also has opposing top and bottom surfaces 38 and 40 extending between the front and back ends 30 and 32 and between the left and right sides 34 and 36. The housing 12 includes a longitudinal axis 41 extending therethrough between the front and back ends 30 and 32. When the hand-held computer 10 is held by a user in a comfortable operating position, longitudinal axis 41 is angled upwardly relative to horizontal with the head 18 being generally above the body 20. An antenna 43 is pivotally mounted to the housing's left side 34 and adapted to transmit and receive data.

The hand-held computer 10 illustrated in the drawings is an Intermec Trakker® Antares™ hand-held computer and scanner. A scanning unit 28 is mounted to the housing's head 18 at the front end 30 and is adapted to scan selected data, such as data collection symbols or the like. The scanning unit 28 is electronically coupled to the electrical components 21 contained in the housing 12, and the electronic components are coupled to a plurality of computer keys 24 and to a display screen 26, which are discussed in greater detail below. Although the illustrated embodiment shows a hand-held computer 10, other hand-held electronic devices such as symbology readers, data collection units, personal digital assistants (PDAs), portable telephones, radios, and the like can be provided under the present invention.

As best seen in FIGS. 1 and 2, the housing's head 18 is wider than the body 20 such that a wide display screen can be provided in the hand-held computer 10, while the body 20 is sized to be comfortably grasped by a user's hand 23 (shown in phantom in FIG. 1). The neck portion 22 extends rearwardly from the head 18 and extends inwardly toward the longitudinal axis 41 to provide a tapered transition between the head and the body 20.

The body 20 includes a contoured gripping portion 42 that extends rearwardly from the neck portion 22 and that is adapted to be grasped by the user's hand 23. The gripping portion 42 has a selected shape and size such that the hand-held computer 10 can be held in the user's hand 23 with part of the bottom surface 40 being supported by an upper portion of the user's palm and the user's fingers substantially between the base of the fingers and the finger joints near the end of the fingers. More specifically, the gripping portion 42 is shaped and sized to be comfortably supported by the user's hand 23 between the metacarpal-phalangeal joint ridge (formed by the joints between the metacarpals, e.g., hand bones, and the phalanges, e.g., finger bones) and the distal inter-phalangeal joints. The user's palm is substantially positioned along the housing's right or left side 34 and 36, depending upon whether the right or left hand, respectively, is grasping the gripping portion. The user's thumb is positioned adjacent to the housing's top surface 38 so the thumb can comfortably reach the computer keys 24 on the top surface 38. Accordingly, the hand-held computer 10 fits comfortably in the user's hand 23 without the user having to uncomfortably orient or stretch his or her hand in order to grasp the housing 12.

The computer's housing 12, and particularly the gripping portion 42 of the exemplary embodiment is designed to fit comfortably within the hand of a North American adult user falling within an ergonomically defined range of approximately a 90th percentile male to a 25th percentile female, inclusive. This range is based on hand size, a larger percentile number being assigned to a large hand, and vice versa. This means that the hand-held computer 10 described herein is designed to accommodate a group of users ranging from a man in the 95th percentile, having a relatively large hand, to a woman in the 25th percentile, having a relatively small hand. It will be appreciated that users falling outside this design range may still enjoy the advantages from the exemplary embodiment and that alternate embodiments can be developed for other target user groups (e.g., males or females with hand sizes below the 25th percentile female hand size) in accordance with the present invention.

As best seen in FIG. 1, the gripping portion 42 is integrally connected to the housing's neck portion 22. The neck portion 22 defines shoulder surfaces 39 along the housing's left and right sides 34 and 36 just forward of the gripping portion 42. Accordingly, the user's hand 23 can rest against the shoulder surfaces 39 without having to tightly grip the housing 12 to prevent it from sliding out of the user's hand during use.

As best seen in FIGS. 2 and 3, the gripping portion 42 has an elongated, contoured protrusion 44 formed therein along the bottom surface 40 substantially adjacent to the neck portion 22. The contoured protrusion 44 has a generally elliptical shape with a complex curvature that corresponds to a support portion of the user's hand defined by the palm and fingers adjacent to the metacarpal-phalangeal joint ridge and the portions of the fingers between the metacarpal-phalangeal joint ridge and the proximal inter-phalangeal joints, which are the finger joints closest to the palm.

In the exemplary embodiment, the contoured protrusion 44 has a sloped forward surface oriented at an angle in the range of approximately 25 degrees to 50 degrees, inclusive, relative to the longitudinal axis 41, and preferably in the range of approximately 30 degrees to 40 degrees, inclusive. The contoured protrusion 44 also has a sloped rear surface oriented at an angle in the range of approximately 4 degrees to 10 degrees, inclusive, relative to the longitudinal axis 41, and preferably in the range of approximately 5 degrees to 8 degrees, inclusive. The sloped rear surface is also oriented at an angle of approximately 10 degrees to 18 degrees, inclusive, relative to the housing's bottom surface 40 that extends between the contoured protrusion 44 and the back end 32.

The contoured protrusion 44 also has sloped left and right side surfaces that are oriented at angles in the range of approximately 35 degrees to 70 degrees, inclusive, relative to the longitudinal axis 41. In the exemplary embodiment, the contoured protrusion 44 is substantially symmetrical along its length, so the left and right side surfaces have approximately the same angular orientation. Accordingly, the contoured protrusion 44 is ergonomically shaped for both the left and right hand of a user.

The contoured protrusion 44 is adapted to substantially correspond to the middle area of the support portion generally between the user's index finger and little finger when the user's hand is grasping the gripping portion 42. The contoured protrusion 44 is also contoured to define a shaped receiving area 43 along the protrusion's forward side that comfortably receives and supports a portion of the user's index finger when the user's hand is grasping the gripping portion 42. Accordingly, the user's index finger can generally hook around the front side of the contoured protrusion 44 for better gripping of the hand-held computer 10.

Figure 4:
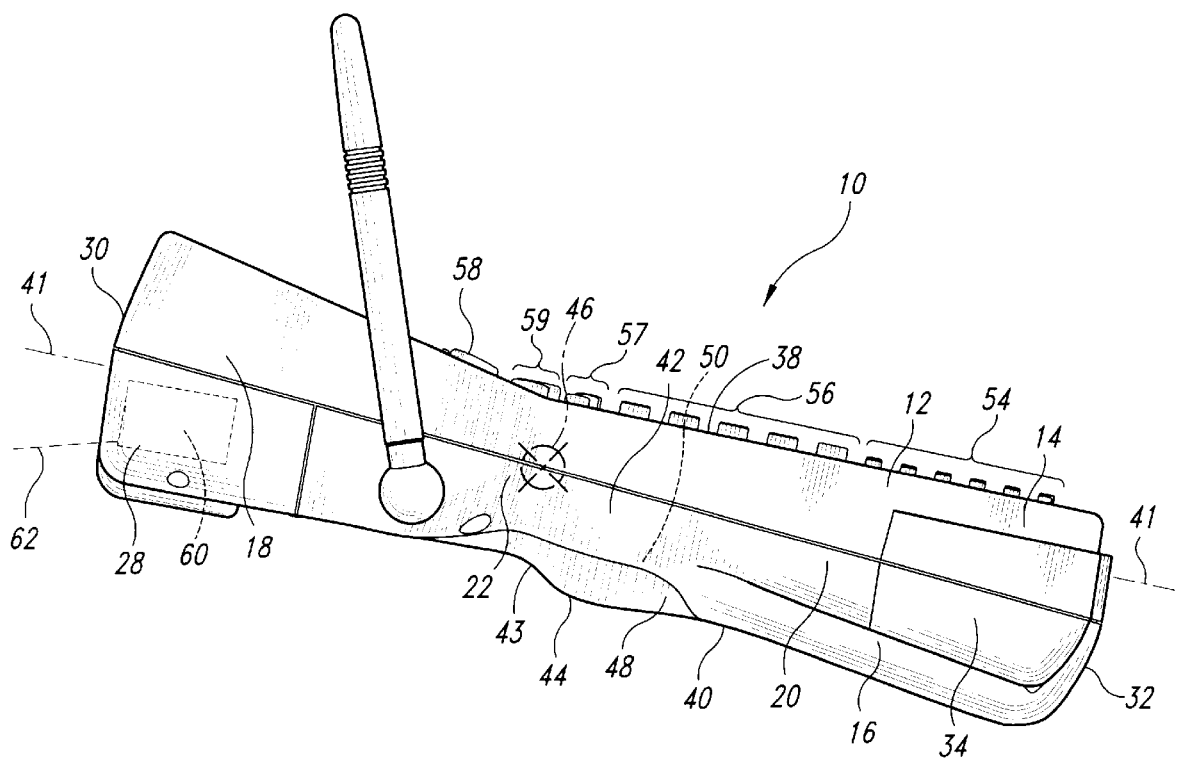
FIG. 4 is a left side elevational view of the hand-held computer of FIG. 1.

As best seen in FIGS. 3 and 4, the housing 12 has a battery receiving area 50 that is removably covered by a battery cover 48. The battery cover 48 defines part of the gripping portion 42 along the housing's bottom surface 40. In the exemplary embodiment, the contoured protrusion 44 is integrally formed in the battery cover 48. This configuration with the contoured protrusion 44 on the battery cover 48 provides a high degree of versatility for fitting the hand-held computer 10 to one or more selected users. One battery cover 48 with first selected contoured protrusion 44, for example to fit smaller hands, can be used for selected users, and a second battery cover having a second selected contoured protrusion, such as for larger hands, could be used for other users. Accordingly, the contoured protrusion 44 is removable from the housing and the housing is configurable to fit different users. In alternate embodiments, the hand-held computer has a battery receiving area in other locations such that the battery cover or other retention mechanisms do not necessarily have the contoured protrusion 44 formed therein.

In another alternate embodiment, the battery itself has an outer housing that connects to the computer's housing 12 and forms part of the gripping portion 42. The contoured protrusion 44 is integrally formed in the battery's outer housing, so one battery with a battery housing having a first selected contoured protrusion 44, for example to fit smaller hands, can be used for selected users, and a second battery having a housing with a second selected contoured protrusion, such as for larger hands, could be used for other users. Accordingly, the contoured protrusion 44 is replaceable upon removing and replacing the battery.

The housing's left and right sides 34 and 36 are integrally connected to the bottom portion 16 and are shaped with a smooth curvature particularly at the gripping portion 42 to avoid sharp or acute corner areas that could provide discomfort to the user during operation. Accordingly, when the user grasps the gripping portion 42, the user's hand extends over smooth contoured curvatures, so the housing 12 is comfortable to hold.

As best seen in FIGS. 3 and 4, the hand-held computer 10 of the exemplary embodiment has a center of gravity shown schematically at 46 within the housing at the gripping portion 42. The center of gravity 46 is generally vertically above the contoured protrusion 44 when the user is holding the hand-held computer 10 in the operating position. Accordingly, the contoured protrusion 44 is positioned between the center of gravity 46 and the support portion of the user's hand. As a result, the hand-held computer 10 is well balanced in the user's hand, thereby minimizing fatigue and discomfort to the user.

As best seen in FIG. 4, the plurality of computer keys 24 protrude upwardly from the housing's upper surface 38. The computer keys 24 define a keypad plane that is substantially parallel with the computer's longitudinal axis 41. In the exemplary embodiment, the computer keys 24 define a first keypad 54 with computer keys that have a first height relative to the housing's upper surface 38. This first keypad 54, as an example, includes alphabetic keys used during operation of the hand-held computer 10. A second keypad 56 is defined by a plurality of larger computer keys 24 that are forward of the first keypad 54 and that are taller than the computer keys of the first keypad. This second keypad 56, for example, includes alphabetic keys, an "enter" key, and function switching keys. The computer keys 24 making up the first keypad 54 generally have a similar shape and height, and differ in size and height to keys in the second keypad 56 so a user can distinguish between the first and second keypads by feel.

A third keypad 57 is provided forward of the second keypad 56 and includes function keys to control various functions performed by the hand-held computer 10. The computer keys 24 on the third keypad 57 can have a uniform shape that differ from a shape of the second keypad 56 so a user can distinguish the second and third keypads by feel. A fourth keypad 59 is provided forward of the third keypad 57 and has directional keys that control cursor direction on the display screen 26. The computer keys 24 on the fourth keypad 59 have different shapes than the keys of the first, second and third keypads 54, 56 and 57 so the user can also identify the fourth keypad by feel without having to look at the computer keys.

The first, second, third, and fourth keypads 54, 56, 57 and 59 of the exemplary embodiment include approximately 55 keys that are coupled with corresponding operations or functions such that no more than one or two keys need to be depressed to activate most functions of the hand-held computer, thereby making selected operations easier and faster. The keypads 54, 56, 57, and 59 are optimally laid out for use in Terminal Equipment (TE) applications, such as 5250, 3270, ANSI VT, etc., applications. The TE options are accessible through a removable overlay, which fits around the computer keys. The most frequently used keys are in the second keypad 56, so the keys are large, easy to use, and located on the housing at or near the gripping portion 42. Accordingly, the most frequently used computer keys 24 may be depressed either with the thumb of the same hand that is holding the gripping portion 42 or with the other hand. These most frequently used computer keys are also positioned at the gripping portion 42 so the hand-held computer 10 will remain balanced within the user's hand even when the computer keys 24 are depressed during a selected operation.

As best seen in FIGS. 1 and 4, the hand-held computer 10 of the exemplary embodiment includes a laser scan activation button 58 which activates the scanning unit 28 when depressed by the user. The scan activation button 58 is located rearward of the display screen 26 and forward of the fourth keypad 59 substantially along the housing's center line. The scan activation button 58 is positioned to allow for easy activation by the thumb of the user's hand grasping the gripping portion 42 whether the user is holding the hand-held computer 10 with the left or right hand. The scan activation button 58 has a different color than the computer keys 24 so the user can easily visually locate the button during use.

As best seen in FIG. 4, the computer's display screen 26 is mounted to the housing's head 18 forward of the computer keys 24. The display screen 26 is tilted upwardly at a selected positive angle relative to the keypad plane 52 and relative to the longitudinal axis 41. The tilted display screen 26 provides an improved viewing angle that increases visibility for the user. The tilted display screen 26 also minimizes glare and distortion that could compromise display screen visibility during use of the hand-held computer 10. The tilted display screen 26 also allows the user to easily and clearly read the screen without having to repetitively tilt or cock the wrist, for example, during a scanning operation wherein the user is pressing selected computer keys 24 and activating the scanner button.

In the exemplary embodiment, the display screen 26 is positioned with a display angle of approximately +12 degrees relative to the keypad plane. In alternate embodiments, the display angle is in the range of approximately +10 to +14 degrees, inclusive, relative to the keypad plane. This range is selected for the alternate embodiments because below 10 degrees the tilted display screen does not provide the desired benefits and over 14 degrees generally provides a screen that is difficult to view, particularly when the display screen is an LCD screen with backlighting.

As best seen in FIG. 4, the scanning unit 28 at the front end of the hand-held computer 10 has a scanner 60 therein that is positioned to scan downwardly relative to the longitudinal axis 41 along a scan plane 62. The scan plane 62 is oriented at a negative angle relative to the hand-held computer's keypad plane and relative to the longitudinal axis 41. When the user is holding the hand-held computer 10 in the operating position with the longitudinal axis 41 projecting forwardly and upwardly, the scan plane 62 is approximately horizontal or angled slightly downwardly. Accordingly, when the scan activation button 58 is depressed, the scanning unit 28 will scan along the scan plane 62 so as to read, as an example, a selected symbol, without the user having to tilt the hand-held computer 10 downwardly in an uncomfortable orientation to aim the scanner.

In the preferred embodiment, the scanning angle is approximately −8 degrees relative to the keypad plane and relative to the longitudinal axis 41. In alternate embodiments, the scanning angle is in the range of approximately −6 degrees to −10 degrees, inclusive. This range of scanning angles is selected based upon ergonomic data of a user's hand, wrist, and arm such that above −6 degrees (e.g. closer to horizontal) and less than −10 degrees (e.g. further from horizontal) requires the user to tilt the wrist and hand to a position that may be uncomfortable, particularly when repeated multiple times during a scanning procedure to aim the scanner unit 28.

The scanner unit 28 of the exemplary embodiment is removably attached to the housing's head 18. If a different scanner unit 28 is desired to provide, as an example, a different scanning angle or orientation, the scanner unit 28 can be removed from the head and replaced with another selected scanner unit in order to provide the desired scanning characteristics for the particular application.

In an alternate embodiment of the invention, not shown, an elastic hand-held strap is removably attached to the front and rear ends of the housing and extends longitudinally adjacent to the housing's bottom surface. The holding strap allows a user to grasp the gripping portion in the manner described above with the user's hand being between the strap and the bottom housing portion. The holding strap allows the user to hold the hand-held computer 10 with a more relaxed, less forceful grip. The holding strap also provides additional support and protection from the user inadvertently dropping the hand-held computer during operation.

Although a specific embodiment of, and examples for, the present invention have been described above for purposes of illustration, various modifications can be made without departing from the spirit and scope of the invention, as will be evident by those skilled in the relative art. For example, the computer keys and keypads may be modified in accordance with the particular characteristics of the hand-held computer and operations to be conducted thereby. The teachings provided herein of the present invention can be applied to other hand-held electronic devices, not necessarily limited to hand-held computers or scanning devices.

In general, in the following claims, the terms used should not be construed to limit the invention to the specific embodiments disclosed in the specification and claims, but should be construed to include all hand-held electronic devices, in accordance with the claims. Accordingly, the invention is not limited by the disclosure, but instead its scope is to be determined entirely from the following claims.

What is claimed is:

1. A hand-held computer having a center of gravity and being adapted to be carried by a hand of a person, the hand having a support portion extending between a metacarpal-phalangeal joint ridge of the hand and proximal phalangeal joints of the hand, comprising:

a housing with a longitudinal axis extending therethrough, the housing having a head portion with a first width, body portion with a second width that is less than the first width, and a neck portion extending between the head and body portions, the neck portion having a variable width tapering between the first and second widths, the body portion including a gripping portion shaped and sized to be gripped by the hand of the person, the gripping portion having a contoured protrusion positioned adjacent to the neck portion and adjacent to the center of gravity, the contoured protrusion being sized and ergonomically shaped to correspond to the support portion of the person's hand;

computer components contained in the housing;

a plurality of computer keys connected to the housing at the body portion and defining a keypad plane;

a scanner unit attached to the head portion of the housing and operatively coupled to the computer components, the scanner unit being positioned to scan along a scanning plane that extends away from the scanner unit at a selected negative angle relative to the keypad plane; and a display screen connected to the head portion and titled at a selected positive angle relative to the keypad plane.

2. The hand-held computer of claim 1 wherein the selected negative angle is in the range of approximately −6 degrees to −10 degrees, inclusive.

3. The hand-held computer of claim 1 wherein the selected negative angle is approximately −8 degrees.

4. The hand-held computer of claim 1 wherein the selected positive angle is in the range of approximately +10 degrees to +14 degrees, inclusive.

5. The hand-held computer of claim 1 wherein the selected positive angle is approximately +12 degrees.

6. The hand-held computer of claim 1 wherein the gripping portion is shaped to correspond to the support portion of the person's hand in the ergonomic range of a 90th percentile male to a 25th percentile female, inclusive.

7. The hand-held computer of claim 1 wherein the housing defines a battery receiving area and the housing has a battery cover removably covering the battery receiving portion, the contoured protrusion being formed on the battery cover.

8. The hand-held computer of claim 1 wherein the plurality of keys defines first and second keypads, the first keypad having a first set of keys having a first height relative to the housing, and the second keypad having a second set of keys having a second height relative to the housing that is greater than the first height.

9. The hand-held computer of claim 1 wherein the scanner unit is removably attached to the housing portion.

10. The hand-held computer of claim 1 wherein the display screen is tilted at a selected angle relative to the longitudinal axis of the housing.

11. A hand-held computer having a center of gravity and being adapted to be carried by a hand of a person, the hand having a support portion extending between a metacarpal-phalangeal joint ridge of the hand and proximal phalangeal joints of the hand, comprising:

a housing with a longitudinal axis extending therethrough, the housing having a head portion with a first width, body portion with a second width that is less than the first width, and a neck portion extending between the head and body portions, the neck portion having a variable width tapering between the first and second widths, the body portion including a gripping portion shaped and sized to be gripped by the hand of the person, the gripping portion having a contoured protrusion positioned adjacent to the neck portion and adjacent to the center of gravity, the contoured protrusion being sized and ergonomically shaped correspond to the support portion of the person's hand;

computer components contained in the housing;

a plurality of computer keys connected to the housing at the body portion and defining a keypad plane at a selected orientation relative to the longitudinal axis of the housing;

a scanner unit attached to the head portion of the housing and operatively coupled to the computer components, the scanner unit being positioned to scan along a scanning plane that extends away from the scanner unit at a first selected angle relative to the longitudinal axis; and a display screen connected to the head portion and titled at a second selected angle relative to the longitudinal axis, the first and second selected angles being on opposite sides of the longitudinal axis.

12. The hand-held computer of claim 11 wherein the first selected angle is in the range of approximately −6 degrees to −10 degrees, inclusive.

13. The hand-held computer of claim 11 wherein the second selected angle is in the range of approximately 10 degrees to 14 degrees, inclusive.

14. The hand-held computer of claim 11 wherein the gripping portion is ergonomically shaped to correspond to the support portion of the person's hand in the ergonomic range of a 90th percentile male to a 25th percentile female, inclusive.

15. The hand-held computer of claim 11 wherein the housing defines a battery receiving area and the housing has a battery cover removably covering the battery receiving portion, the contoured protrusion being formed in the battery cover.

16. The hand-held computer of claim 11 wherein the contoured protrusion is an elongated protrusion.

17. A hand-held computer having a center of gravity and being adapted to be carried by a hand of a person, the person's hand having a support portion extending between a metacarpal-phalangeal joint ridge of the hand and proximal phalangeal joints of the hand, comprising a housing defined by top and bottom housing portions, the housing having a gripping portion with a contoured protrusion formed on the bottom housing portion and adjacent to the center of gravity, the contoured protrusion being sized and ergonomically shaped to correspond to the support portion of the person's hand when the hand-held computer is carried by the person such that the contoured protrusion is generally between the support portion and the center of gravity.

18. The hand-held computer of claim 17 wherein the housing has a head portion with a first width, a body portion with a second width less than the first width, and a neck portion extending between the head and body portions and having a variable width tapering between the first and second widths, the contoured protrusion being positioned substantially adjacent to the neck portion.

19. The hand-held computer of claim 17 wherein the housing has a longitudinal axis, and further comprising a display screen connected to the housing, the display screen being titled at a selected angle relative to the longitudinal axis.

20. The hand-held computer of claim 17 wherein the contoured protrusion being removably connected to the housing's bottom portion.

21. The hand-held computer of claim 17 wherein the contoured protrusion is ergonomically shaped to correspond to the support portion of the person's hand in the range of a 90th percentile North American male and a 25th percentile North American female.

22. The hand-held computer of claim 17 wherein the housing has a longitudinal axis, and further comprising a scanner unit attached to the housing and positioned to scan along a scanning plane that extends away from the scanner unit at a selected angle relative to the longitudinal axis.

23. The hand-held computer of claim 17 wherein the housing is substantially symmetric about the longitudinal axis to allow the hand-held computer to be carried by a person's left or right hand.

* * * * *